US010857463B2

(12) United States Patent
Ikuta et al.

(10) Patent No.: US 10,857,463 B2
(45) Date of Patent: Dec. 8, 2020

(54) STORAGE MEDIUM AND OPERATION INPUT SCHEME CONTROL METHOD

(71) Applicant: SQUARE ENIX CO., LTD., Tokyo (JP)

(72) Inventors: Yasuhiro Ikuta, Tokyo (JP); Atsushi Katada, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 16/429,234

(22) Filed: Jun. 3, 2019

(65) Prior Publication Data

US 2019/0374856 A1 Dec. 12, 2019

(30) Foreign Application Priority Data

Jun. 6, 2018 (JP) ................................ 2018-108712

(51) Int. Cl.
*A63F 13/537* (2014.01)
*A63F 13/22* (2014.01)
(Continued)

(52) U.S. Cl.
CPC ............ *A63F 13/537* (2014.09); *A63F 13/22* (2014.09); *G06F 3/0482* (2013.01); *G06F 3/04847* (2013.01)

(58) Field of Classification Search
None
See application file for complete search history.

(56) References Cited

U.S. PATENT DOCUMENTS 8,072,434 B2 12/2011 Yoshioka
9,471,201 B1 * 10/2016 Truong ................ G06F 3/0485
(Continued)

FOREIGN PATENT DOCUMENTS

JP 2008-225870 9/2008
JP 2012-168932 9/2012
(Continued)

OTHER PUBLICATIONS

Steam version "Chrono Trigger", Dengeki Online, May 17, 2018, URL, https://dengekionline.com/elem/000/001/728/1728412/.
(Continued)

*Primary Examiner* — Tramar Y Harper
(74) *Attorney, Agent, or Firm* — Greenblum & Bernstein, P.L.C.

(57) ABSTRACT

The present invention provides a non-transitory computer-readable storage medium storing program configured to enable an operation input scheme to be switched for game operation, the program causes a computer to execute processing for selecting to receive operation input by either a first operation input scheme or a second operation input scheme; processing for receiving operation input defined for the selected operation input scheme; processing for, based on the received operation input, controlling the game; and processing for outputting a game screen according to the game, wherein the game screen includes a graphical user interface (GUI), and a GUI arrangement configuration in the game screen differs depending on which of the first operation input scheme or the second operation input scheme the selected operation input scheme is.

6 Claims, 6 Drawing Sheets

(51) Int. Cl.
*G06F 3/0482* (2013.01)
*G06F 3/0484* (2013.01)

(56) References Cited

U.S. PATENT DOCUMENTS 9,910,560 B2 * 3/2018 Hayashi ................ G06F 3/0488
10,070,044 B2 9/2018 Shimosato
2006/0116203 A1 * 6/2006 Nakada .................. A63F 13/10 463/30
2006/0293103 A1 * 12/2006 Mendelsohn .......... G06Q 30/02 463/42
2008/0058103 A1 * 3/2008 Kovacic .................. G07F 17/32 463/37
2008/0113793 A1 * 5/2008 Miyamoto ............ A63F 13/005 463/31
2010/0007613 A1 * 1/2010 Costa .................... G06F 1/1601 345/173
2010/0302190 A1 * 12/2010 Yeh ....................... G06F 1/1626 345/173
2010/0306813 A1 * 12/2010 Perry ...................... H04L 67/18 725/114
2012/0220372 A1 * 8/2012 Cheung ............... G06F 3/04886 463/37
2012/0242590 A1 * 9/2012 Baccichet ............. A63F 13/533 345/173
2012/0264511 A1 * 10/2012 Marsland ................ H04L 67/38 463/31
2013/0293497 A1 * 11/2013 Yang ...................... F16M 11/38 345/173
2013/0331182 A1 * 12/2013 Tanzawa ............... A63F 13/426 463/31
2016/0189328 A1 * 6/2016 Vranjes ................. G06F 3/0202 345/173

FOREIGN PATENT DOCUMENTS

JP 2013-156923 8/2013
JP 2013-214863 10/2013

OTHER PUBLICATIONS

Update brings implementation of battle UI optimized for game pad and keyboard Kafuji Sato, Game Graphics.
Japanese Office Action dated Jul. 29, 2019 issued in Japan Patent Application No. 2018-108712.

* cited by examiner

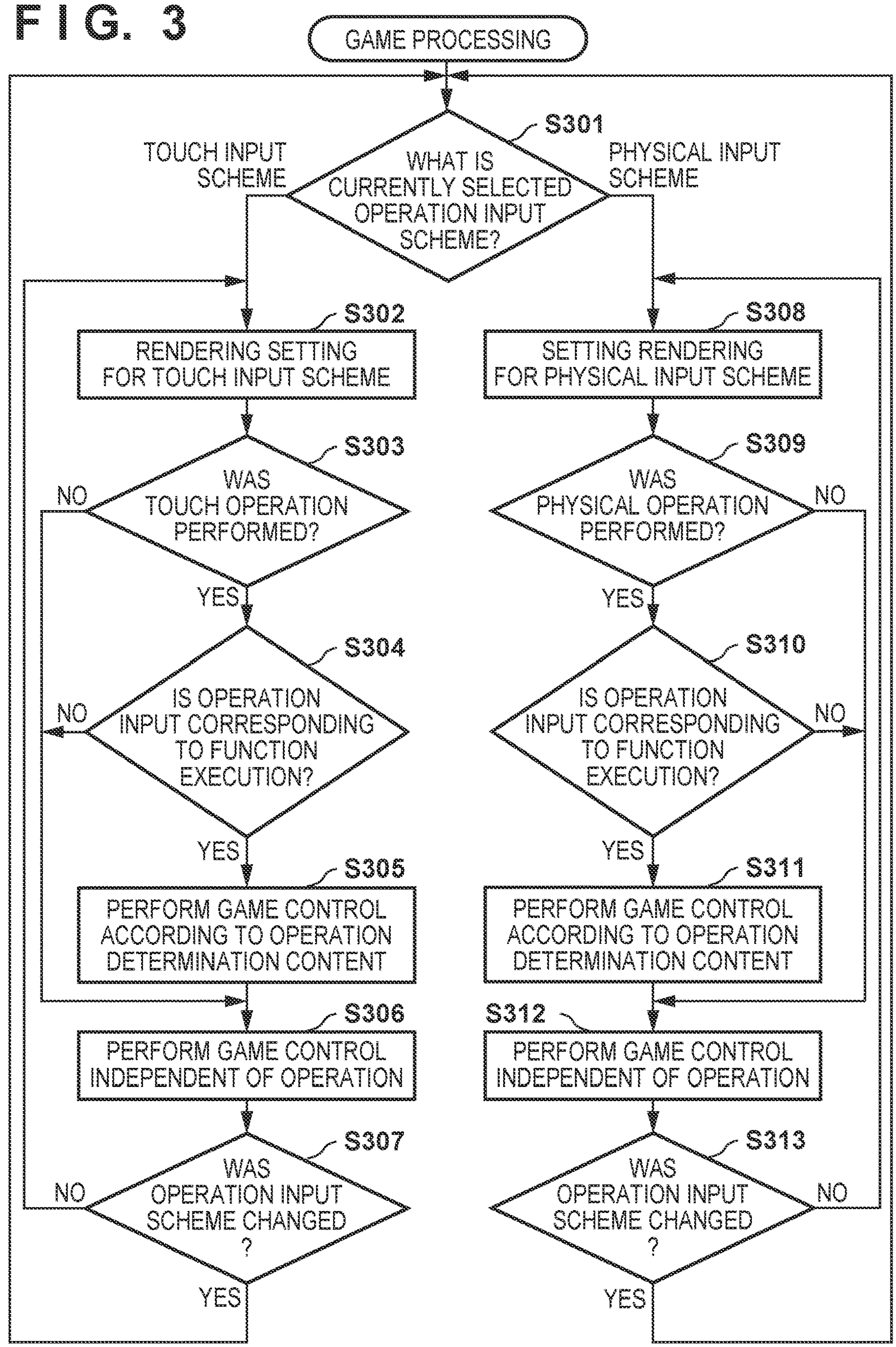
FIG. 3
GAME PROCESSING
S301
WHAT IS CURRENTLY SELECTED OPERATION INPUT SCHEME?
TOUCH INPUT SCHEME
PHYSICAL INPUT SCHEME
S302
RENDERING SETTING FOR TOUCH INPUT SCHEME
S303
WAS TOUCH OPERATION PERFORMED?
NO
YES
S304
IS OPERATION INPUT CORRESPONDING TO FUNCTION EXECUTION?
NO
YES
S305
PERFORM GAME CONTROL ACCORDING TO OPERATION DETERMINATION CONTENT
S306
PERFORM GAME CONTROL INDEPENDENT OF OPERATION
S307
WAS OPERATION INPUT SCHEME CHANGED ?
NO
YES
S308
SETTING RENDERING FOR PHYSICAL INPUT SCHEME
S309
WAS PHYSICAL OPERATION PERFORMED?
NO
YES
S310
IS OPERATION INPUT CORRESPONDING TO FUNCTION EXECUTION?
NO
YES
S311
PERFORM GAME CONTROL ACCORDING TO OPERATION DETERMINATION CONTENT
S312
PERFORM GAME CONTROL INDEPENDENT OF OPERATION
S313
WAS OPERATION INPUT SCHEME CHANGED ?
NO
YES

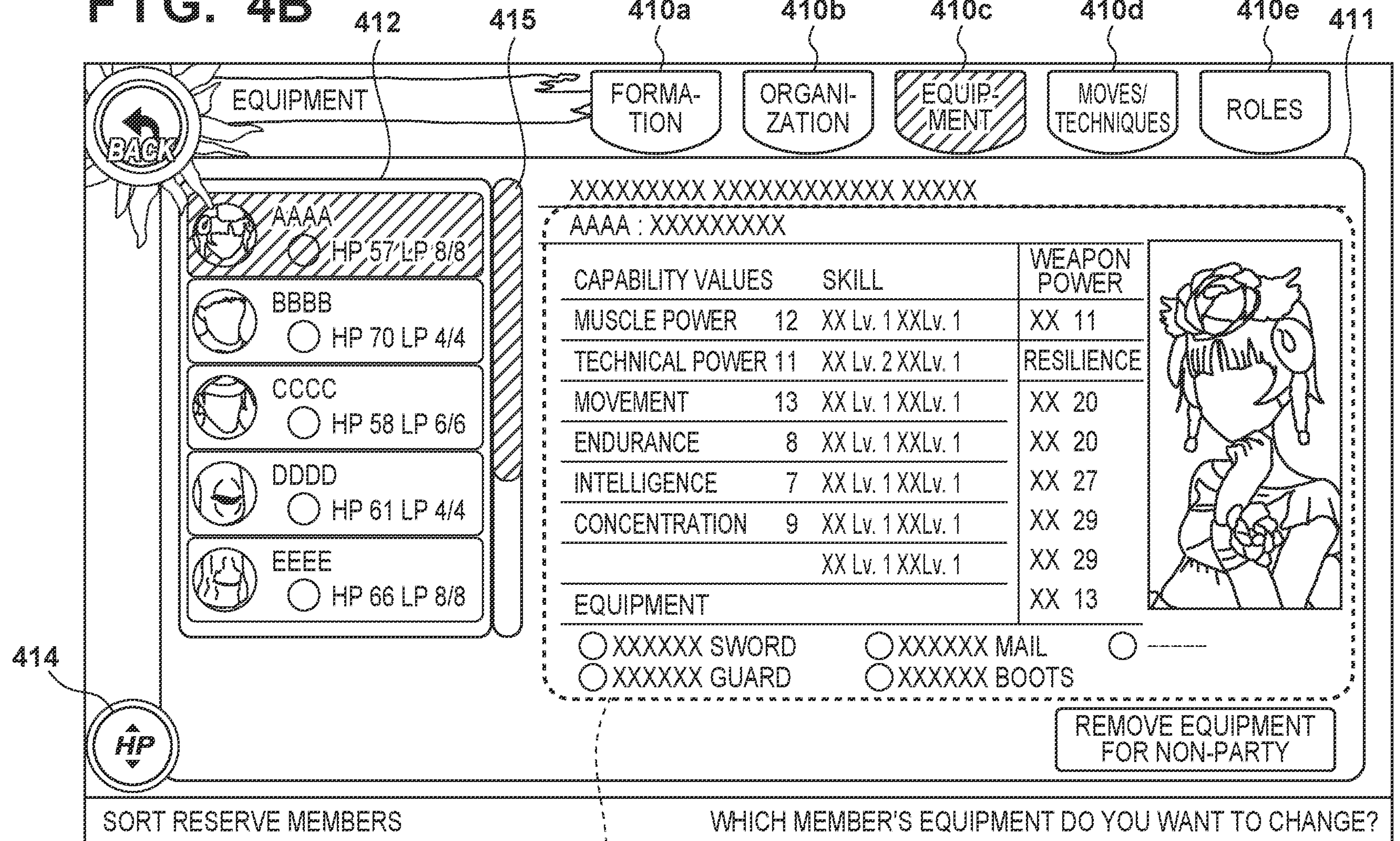
FIG. 4B
412
415
410a
410b
410c
410d
410e
411
EQUIPMENT
FORMA-TION
ORGANI-ZATION
EQUIP-MENT
MOVES/TECHNIQUES
ROLES
BACK
AAAA HP 57 LP 8/8
BBBB HP 70 LP 4/4
CCCC HP 58 LP 6/6
DDDD HP 61 LP 4/4
EEEE HP 66 LP 8/8
XXXXXXXXX XXXXXXXXXXXX XXXXX
AAAA : XXXXXXXXX
CAPABILITY VALUES
SKILL
WEAPON POWER
MUSCLE POWER 12
XX Lv. 1 XXLv. 1
XX 11
TECHNICAL POWER 11
XX Lv. 2 XXLv. 1
RESILIENCE
MOVEMENT 13
XX Lv. 1 XXLv. 1
XX 20
ENDURANCE 8
XX Lv. 1 XXLv. 1
XX 20
INTELLIGENCE 7
XX Lv. 1 XXLv. 1
XX 27
CONCENTRATION 9
XX Lv. 1 XXLv. 1
XX 29
XX Lv. 1 XXLv. 1
XX 29
XX 13
EQUIPMENT
XXXXXX SWORD
XXXXXX GUARD
XXXXXX MAIL
XXXXXX BOOTS
414
HP
REMOVE EQUIPMENT FOR NON-PARTY
SORT RESERVE MEMBERS
WHICH MEMBER'S EQUIPMENT DO YOU WANT TO CHANGE?
413

FIG. 5B

STORAGE MEDIUM AND OPERATION INPUT SCHEME CONTROL METHOD

CROSS-REFERENCE TO RELATED APPLICATION

This application claims priority to and the benefit of Japanese Patent Application No. 2018-108712, filed on Jun. 6, 2018, the entire disclosure of which is incorporated herein by reference.

BACKGROUND OF THE INVENTION

Field of the Invention

The present invention relates to a storage medium, and an operation input scheme control method, and particularly to a computerized game for which a plurality of types of operation input schemes are provided.

Description of the Related Art

Calculation capabilities and rendering capabilities of mobile terminals such as portable telephones and smart phones are improving, and software that conventionally had been provided for dedicated hardware has come to be executable on a mobile terminal. It is similar for games developed for a home game consoles, for example, and it has become possible to provide experiences to a broader user group by so-called “porting” where a game is provided so as to be executable on a mobile terminal by adjusting the game for the mobile terminal. Alternatively, there are games for which multiplatform deployment is envisioned from the development stage so as to enable the same game title to be played on a plurality of types of hardware.

Meanwhile, since it is difficult to provide a large number of physical operation input unit members such as buttons particularly in a small mobile terminal such as a smart phone, a touch panel is used as a main operation input unit member. Accordingly, by configuring a game program to provide regions in which to receive operation input corresponding to each button of a game controller respectively within the display region when executing a game developed for a home game console on a mobile terminal, operation of the game is made possible (Japanese Patent Laid-Open No. 2012-168932).

Incidentally, in conjunction with various software becoming executable on a mobile terminal, recent mobile terminals have come to be configured so that external display output is simple, and also there are various user play styles when playing a game that is executed on a mobile terminal. A play style in which a user performs operations while looking at game screens that are provided on a display apparatus that the mobile terminal has and in which a GUI that displays a region for receiving touch operations is superimposed is typical, but it is also possible to perform game play by outputting such game screens to display them on an external display apparatus.

However, in game screens configured for touch operation on a mobile terminal, since the size of each GUI is designed in accordance with the size of a person’s finger, for example, so that it is possible to realize suitable operation input on the mobile terminal, the proportion of the area that the GUI covers in a game screen is comparatively large. Consequently, even if an external display output of a game screen, for example, to a display apparatus provided with a large display region is performed, the proportion that the GUI covers on the screen is maintained, and the user may be left with the impression that the game screens are not provided with suitable visibility.

Also, various peripheral devices have come to be connectable to a mobile terminal, and, when a game controller, for example, is connected and used for operation input, there is less need for such a GUI for touch operations in the game screens, and in the end the user may be left with the impression that game screens are not provided with suitable visibility.

In other words, there was the possibility that an operation input scheme that is customized for specific hardware and GUIs therefor were not necessarily suitable depending on the hardware usage style.

SUMMARY OF THE INVENTION

At least one embodiment of the present invention was made in light of the described above problems, and provides a storage medium and an operation input scheme control method for realizing suitable game operation by a desired operation input scheme.

The present invention in its first aspect provides a non-transitory computer-readable storage medium storing a program configured to enable an operation input scheme to be switched for game operation, the program causes a computer to execute processing for selecting to receive operation input by either a first operation input scheme or a second operation input scheme; processing for receiving operation input defined for the selected operation input scheme; processing for, based on the received operation input, controlling the game; and processing for outputting a game screen according to the game, wherein the game screen includes a graphical user interface (GUI), and a GUI arrangement configuration in the game screen differs depending on which of the first operation input scheme or the second operation input scheme the selected operation input scheme is.

The present invention in its second aspect provides a method for controlling an operation input scheme that controls switching of the operation input scheme for operation of a game, the method comprising: selecting to receive operation input by either a first operation input scheme or a second operation input scheme; receiving operation input defined for the selected operation input scheme; based on the received operation input, controlling the game; and outputting a game screen according to the game, wherein the game screen includes a graphical user interface (GUI), and a GUI arrangement configuration in the game screen differs depending on which of the first operation input scheme or the second operation input scheme the selected operation input scheme is.

Further features of the present invention will become apparent from the following description of exemplary embodiments (with reference to the attached drawings).

BRIEF DESCRIPTION OF THE DRAWINGS

FIG. 3 is a flowchart exemplifying game processing included in a game application according to an embodiment of the present invention.

FIGS. 4A and 4B are views exemplifying a configuration of game screens that are outputted for display in a case where a touch input scheme has been selected in a game application according to an embodiment of the present invention.

FIGS. 5A and 5B are views exemplifying a configuration of game screens that are outputted for display in a case where a physical input scheme has been selected in a game application according to an embodiment of the present invention.

DESCRIPTION OF THE EMBODIMENTS

Embodiments

Figure 1:
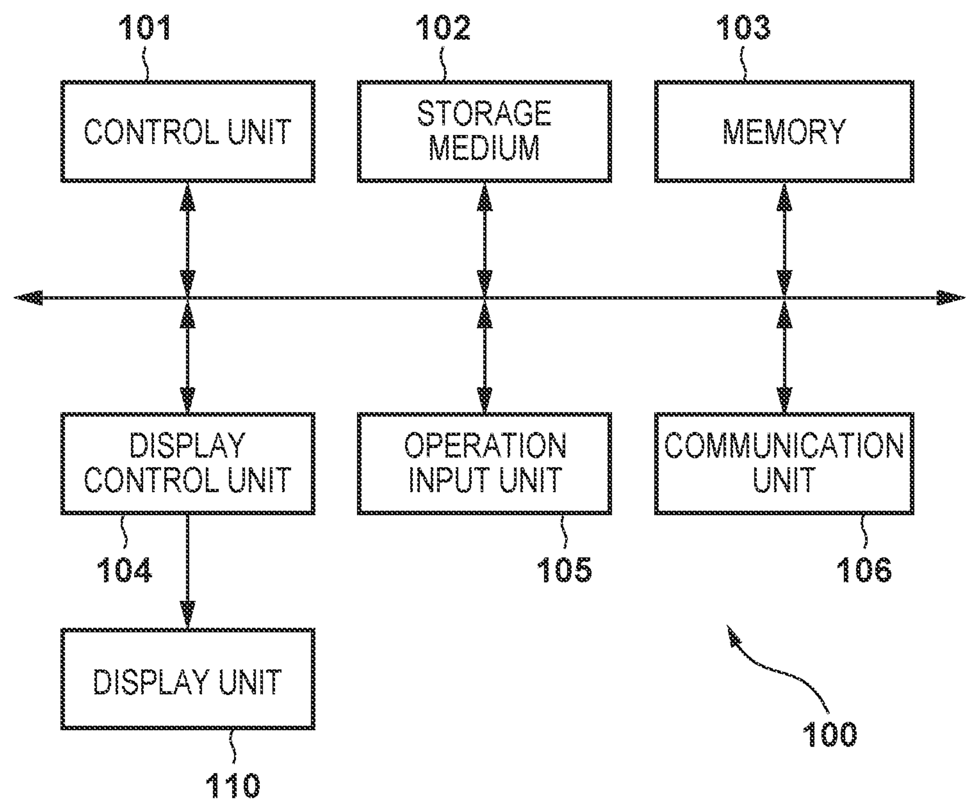
FIG. 1 is a block diagram illustrating a functional configuration of a smartphone 100 according to an embodiment of the present invention.

Exemplary embodiments of the present invention will be explained hereinafter in detail, with reference to the drawings. Note that regarding embodiments described below, description is given of an example that applies the present invention to, as an example of a computer that executes processing according to a program of the present invention, a smart phone configured such that operation input by touch operation is possible. However, the present invention can be applied to a program that is executable on any device configured so that it is possible to switch between a plurality of types of operation input schemes for game operation.

A game for which a play experience is provided by an application program being executed on the smart phone of the present embodiment is designed for multiple platforms, and is assumed to be configured such that a similar play experience can be provided on any device having a corresponding hardware configuration. In other words, though an execution environment differs and there is a difference in the quality and format of models and textures that can be used for rendering from the viewpoint of performance, a similar experience is provided to the user whatever the hardware is.

In the present embodiment, for simplicity, hardware included in multiple platforms is described as being essentially broadly dividable into the following two types according to the operation input scheme provided to enable reception of input for the game. Firstly, one type is hardware that connects an operation input device such as a game pad, a joystick, a keyboard, or a mouse as an input interface, and that performs control of a game with operations made in relation to a physical an operating member arranged on such a device as operation input, and a home game console or a PC correspond thereto. Another type is hardware that has, as an input interface, a touch panel with a touch panel sensor, which may be of any detection scheme, and that performs control of a game with touch operations made in relation to the touch panel as operation input, and a smart phone or a tablet correspond thereto.

A scheme for receiving operations mainly via a physical operating member that uses hardware of the former (hereinafter referred to as physical operation HW) is a physical input scheme as a second operation input scheme according to the present invention. Meanwhile, a scheme for receiving touch operations via a touch panel that uses hardware of the latter (hereinafter referred to as touch operation HW) is a touch input scheme as a first operation input scheme according to the present invention.

In the present embodiment, description will be given of an embodiment that applies the present invention to a smart phone, as an example of touch operation HW, that has physical operating members but whose operating members do not receive operations that directly contribute to the control of the game, such as a power button, a sound volume adjustment button, and a home display button, and that only receives touch operations for game control. Here, the smart phone is configured such that another operation input device having a physical operating member such as a game pad can be connected thereto (the connection may be wired or wireless), and functions as physical operation HW in a case where such a device is connected and in a state in which it is usable, and can thus also receive operation input in a physical input scheme. Specifically, the smart phone, depending on usage style, is configured to be capable of switching the operation input scheme to either of the touch input scheme and the physical input scheme.

Note that application of the present invention is not limited to a smart phone with a touch panel, and application to other devices is also possible. In other words, the present invention can be applied even to physical operation HW such as a game console or a PC, if it is configured to have a touch panel or it is configured such that a touch operation made on a display apparatus with a touch panel that is externally connected can be used for game control.

Configuration of Smart Phone

FIG. 1 is a block diagram illustrating a functional configuration of the smartphone 100 according to an embodiment of the present invention.

A control unit 101 is a CPU, for example, and controls operation of each block that the smartphone 100 comprises. The control unit 101 controls operation of each block by reading an operation program of the respective block which is stored in a storage medium 102, loading the program in to a memory 103, and executing the program.

The storage medium 102 may include a rewritable built-in memory that the smartphone 100 comprises, for example, an HDD, or an optical disk that can be read via an optical drive, and the storage medium 102 is a non-volatile storage apparatus. The storage medium 102 stores not only operation programs of each block but also information such as various parameters that are necessary in the operation of each block. A program and various data of a game application that is executed on the smartphone 100 of the present embodiment is also assumed to be stored in the storage medium 102. The memory 103 is, for example, a volatile memory, and is used not only as a region for deploying the operation program of each block and the game application program, but also as a storage region for temporarily storing intermediate data or the like that is outputted in operation by each block.

A display control unit 104 includes, for example, a GPU and a rendering chip, and generates an image (game screen) to be displayed on a display unit 110 that the smartphone 100 comprises during execution of the game application. The display unit 110 is a display apparatus such as, for example, an LCD that the smartphone 100 comprises. In the present embodiment, the display unit 110 is described as being embedded in the smartphone 100 and being of an integrated type, but embodiments of the present invention are not limited to this, and an apparatus that displays game screens generated by the display control unit 104 may be any display apparatus connected to the smartphone 100 (the connection may be wired or wireless).

An operation input unit 105 is, for example, an input interface that the smartphone 100 comprises, such as a touch panel or a button. The operation input unit 105 detects an operation input made by a user in relation to an input interface, and outputs to the control unit 101 a control signal corresponding to the operation input. In a case where the smartphone 100 of the present embodiment executes a game application, operation input corresponding to the game is essentially performed based on touch operations in relation to a touch panel. Meanwhile, as described above, configuration is such that by connecting an external operation input device to the smartphone 100, game control based on operations performed in relation to a physical operating member (aside from operating members that the smartphone 100 comprises such as the power button and the sound volume adjustment button) is possible.

A communication unit 106 is a communication interface that the smartphone 100 comprises and that is for performing communication with another apparatus. The communication unit 106 connects to another server or the like that is present on a network, for example, by a predetermined communication method (the connection may be wired or wireless), and performs data transmission/reception. The game application may be configured to be able to receive data from an external apparatus via the communication unit 106.

Module Configuration According to Game

Figure 2:
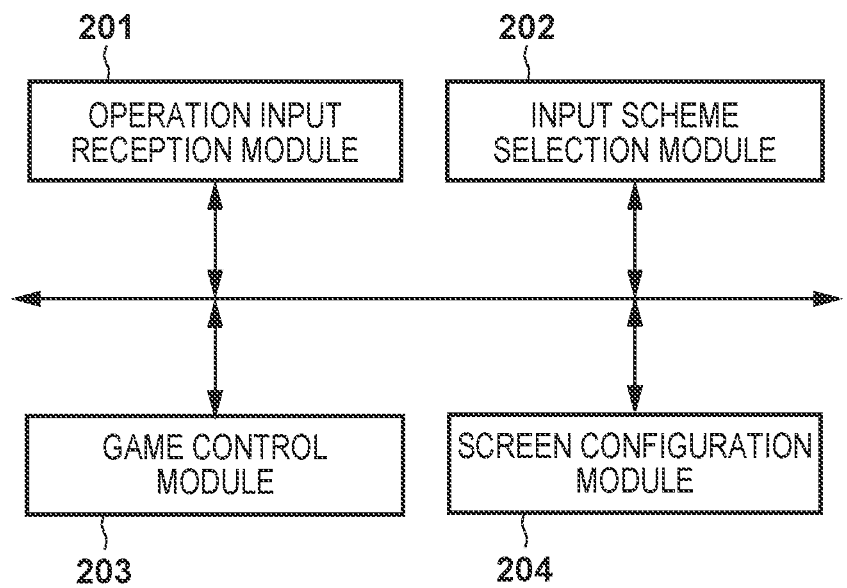
FIG. 2 is a block diagram illustrating module configurations realized in a case where a game application according to an embodiment of the present invention is executed.

Next, with reference to FIG. 2, description will be given regarding a module configuration corresponding to each function according to the present invention that is realized by respective hardware upon the program of the game application being loaded into the memory 103 and executed.

An operation input reception module 201, in accordance with an operation input scheme that is currently selected, determines which kind of operation input that is predefined for the game the operation input detected by the operation input unit 105 corresponds to, and receives such operation input. In the present embodiment, the operation input reception module 201, in accordance with whichever of the touch input scheme and the physical input scheme the selected operation input scheme is, switches the operation input device for detecting the operation input, and determines the operation input performed in relation to the operation input device. In the present embodiment, for simplicity, the operation input reception module 201 is assumed to determine a touch operation made in relation to the touch panel when the touch input scheme is selected and to determine a control signal to receive based on operation input made in relation to an operation input device having a physical operating member when the physical input scheme is selected. Essentially, the operation input reception module 201 may be realized by detecting operation input by the operation input unit 105 and determining the operation input by the control unit 101.

An input scheme selection module 202 selects an operation input scheme for receiving operation input used for control of the game from among the touch input scheme and the physical input scheme, and controls operation input that the operation input reception module 201 determines. In the present embodiment, selection of the operation input scheme, may be performed based on user operation input for selecting which operation input scheme to use on a setting screen displayed during execution of the game application, for example. Essentially, the input scheme selection module 202 may be realized by operation control of the operation input unit 105 by the control unit 101 or control for changing the operation input that is the target of the determination by the control unit 101.

A game control module 203 performs various control for a game by which a play experience is provided in a case where the game application is executed on the smartphone 100. In a case where a predefined operation input is determined by the operation input reception module 201 to have been performed for a current operation input scheme, the game control module 203 performs game control so as to apply an operation associated with the operation input. Here, control of the game is described mainly as control according to a change of state triggered in accordance with an operation input such as a character operation, an object change, a scene change, a screen change (including GUI display control), or the like, but limitation is not made to this, and control according to temporal change independent of operation input may be included. Essentially, the game control module 203 may be realized by the control unit 101.

A screen configuration module 204 performs rendering of a game screen in a state in which control by the game control module 203 is reflected, and superimposition of various GUIs, and ultimately configures the game screen to be displayed on the display unit 110. In more detail, the screen configuration module 204 renders a 3D scene constructed by arranging various drawing objects according to the game in a state defined for a frame to be rendered, and further generates a game screen by overlapping two-dimensional GUIs determined for the currently selected operation input scheme. Essentially the screen configuration module 204 may be realized by the display control unit 104.

Game Processing

Using the flowchart of FIG. 3, description will be given of specific processing for game processing performed during execution of a game application in the smartphone 100 of the present embodiment having this kind of configuration. Processing corresponding to the flowchart can be realized by the control unit 101 reading a corresponding program that is stored in the storage medium 102, for example, loading the program into the memory 103, and executing the program.

Note that this game processing is described as something that is started when progress reaches a game part that provides predetermined game-play in a game application, for example. This game processing is described as processing that loops while the game part continues without particularly determining an end condition, but this loop, in order to simplify the explanation, is assumed to be processed in synchronism with a frame cycle at which rendering is performed. Specifically, in this game processing, processing according to one loop for a single frame is executed in accordance with the game screen update frequency. Also, it is assumed that when a game application is executed for the first time, the touch input scheme is selected as the default operation input scheme. However, it goes without saying that in implementation of the present invention, the default operation input scheme is not limited to this, and may be set in accordance with the hardware on which the game application is executed.

In step S301, the operation input reception module 201 determines whether the currently selected operation input scheme is the touch input scheme or the physical input scheme. The operation input reception module 201 moves the processing to step S302 in the case where the currently selected operation input scheme is determined to be the touch input scheme, and moves the processing to step S308 in the case where the currently selected operation input scheme is determined to be the physical input scheme.

In step S302, the display control unit 104, upon generation of a game screen, performs a rendering setting so as to arrange a GUI corresponding to the touch input scheme in the game screen.

Game Screens when Touch Input Scheme is Selected

Here, with reference to FIGS. 4A and 4B, description will be given for a configuration of a GUI arranged in a game screen in a case where the touch input scheme is selected. A GUI corresponding to the touch input scheme, as illustrated in FIGS. 4A and 4B, is configured so that a touch operation by a person's finger is easy to perform when a game screen is displayed on the display apparatus that a smart phone of a typical size is equipped with.

Figure 4A:
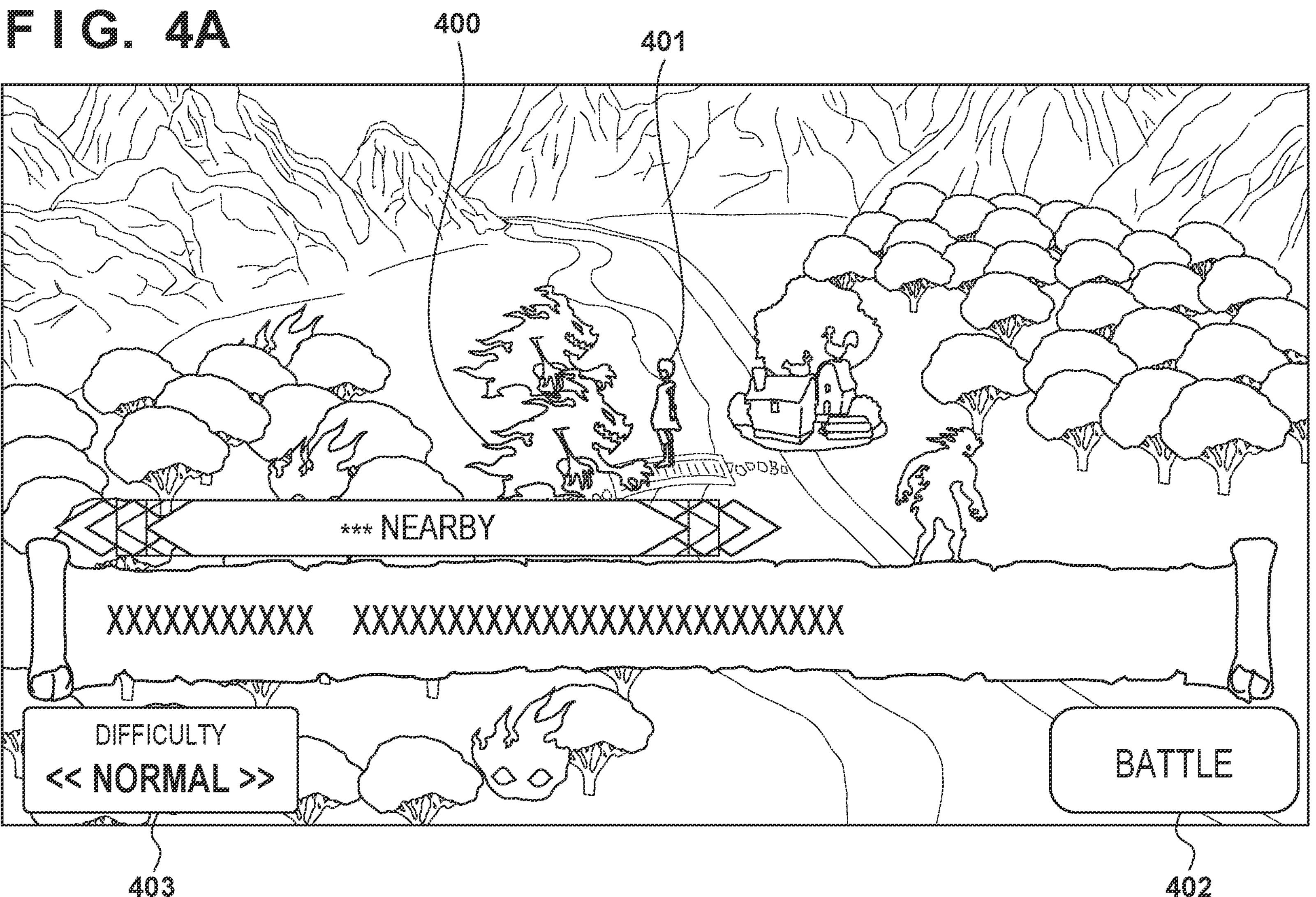

FIG. 4A illustrates a field screen according to a game of the present embodiment in which it is possible to cause a character (operated character) associated with the user to move, and which is displayed in a case where the touch input scheme is selected. The field screen is configured such that in a case where an operated character 401 is moving in a predetermined region provided near an object 400 which is for the progression of an event (battle event) and which is present in the field, a "battle" button 402 for starting the event is displayed in the bottom-right of the screen. Also, a scroll object 403 for changing the difficulty that can be changed by a flick operation, for example, is included in the bottom-left of the screen such that it is possible to easily change the difficulty according to the battle event.

Also, FIG. 4B illustrates a status screen by which various settings for a group of characters that a user can use in the game are possible. In the status screen, configuration is such it is possible to switch between tabs 410*a* to 410*e* for deciding (organization) the characters to include in a party (a group of characters that participate in a battle event including the operated character in the field screen), character arrangement (formation) in a battle, equipment (equipment) of each character, confirmation of invokable special command (moves/techniques), and roles (roles) of characters in the party, and perform setting according to each tab and the status confirmation in region 411.

In the status screen of FIG. 4B, a state of a region 411 in a case where the equipment tab 410*c* is selected is exemplified, and characters that the user can use in a battle are each displayed selectably in a list 412 (by default, the first character in the list is in a selected state). When a character in the list 412 is selected by a single tap, various statuses including the external appearance of the character and items in the current equipment are displayed in the region 413. Configuration is such that the characters in the list 412 can be sorted by a touch operation on a button 414, and the sorting rule is switched whenever a touch is performed. Also, in the example of the figure, five characters can be displayed at one time in the list 412, and it is possible to cause other characters to be displayed in the region of the list 412 by performing a slide operation on a scroll bar 415. Regarding equipment change, it may be possible to select equipment from owned items for each part of a character in a window that is additionally displayed when a character is selected with a double tap in the list 412, for example.

Essentially, in a game screen displayed in a case where a touch input scheme is selected, for each item for which a function can be realized by a touch operation, a GUI that has a region of a size that is easy to select with a person's finger is arranged. Accordingly, the GUI provided for each item is designed such that a minimum required size is defined or a restriction is arranged so that the distance between the centers of one GUI and another adjacent GUI is a predetermined distance. Accordingly, the occupation rate of the GUIs in the screen is necessarily specified in accordance with the number of items to be arranged on the game screen, and it is necessary for other display elements to be decreased or it is necessary for the visibility to be reduced in accordance therewith.

In step S303, the operation input reception module 201 determines whether or not a touch operation was performed. The operation input reception module 201 moves the processing to step S304 in a case where it is determined that a touch operation was made, and moves the processing to step S306 in a case where it is determined that no touch operation was made.

In step S304, the operation input reception module 201 determines the touch operation that was made, and determines whether or not it is an operation input corresponding to the execution of one of the functions defined for the touch input scheme. Here, the functions that are the target of the determination are not limited to functions according to the items arranged as GUIs on the game screen. The operation input reception module 201 moves the processing to step S305 in a case where it determines that the performed touch operation is an operation input corresponding to the execution of one of the functions, and moves the processing to step S306 in the case where it is determined that it is not an operation input corresponding to execution of one of the functions.

In step S305, the game control module 203 executes game control corresponding to operation input in accordance with the touch operation determination content.

In addition to this, in step S306, the game control module 203 executes game control according to the frame that is to be performed irrespective of the existence/absence of operation input. Also, the screen configuration module 204 generates a game screen including a GUI corresponding to the touch input scheme, and performs screen update processing for outputting a display to the display unit 110.

In step S307, the operation input reception module 201 determines whether or not an operation according to a change in the operation input scheme was performed. The operation input reception module 201 returns the processing to step S301 in a case where it is determined that an operation according to a change in the operation input scheme was made, and returns the processing to step S302 in a case where it is determined that no such operation was made.

Meanwhile, in a case where the operation input scheme that is currently selected in step S301 is determined to be the physical input scheme, the display control unit 104, in step S308, performs a rendering setting so as to arrange a GUI corresponding to the physical input scheme on the game screen.

Game Screens when Physical Input Scheme is Selected

Figure 5A:
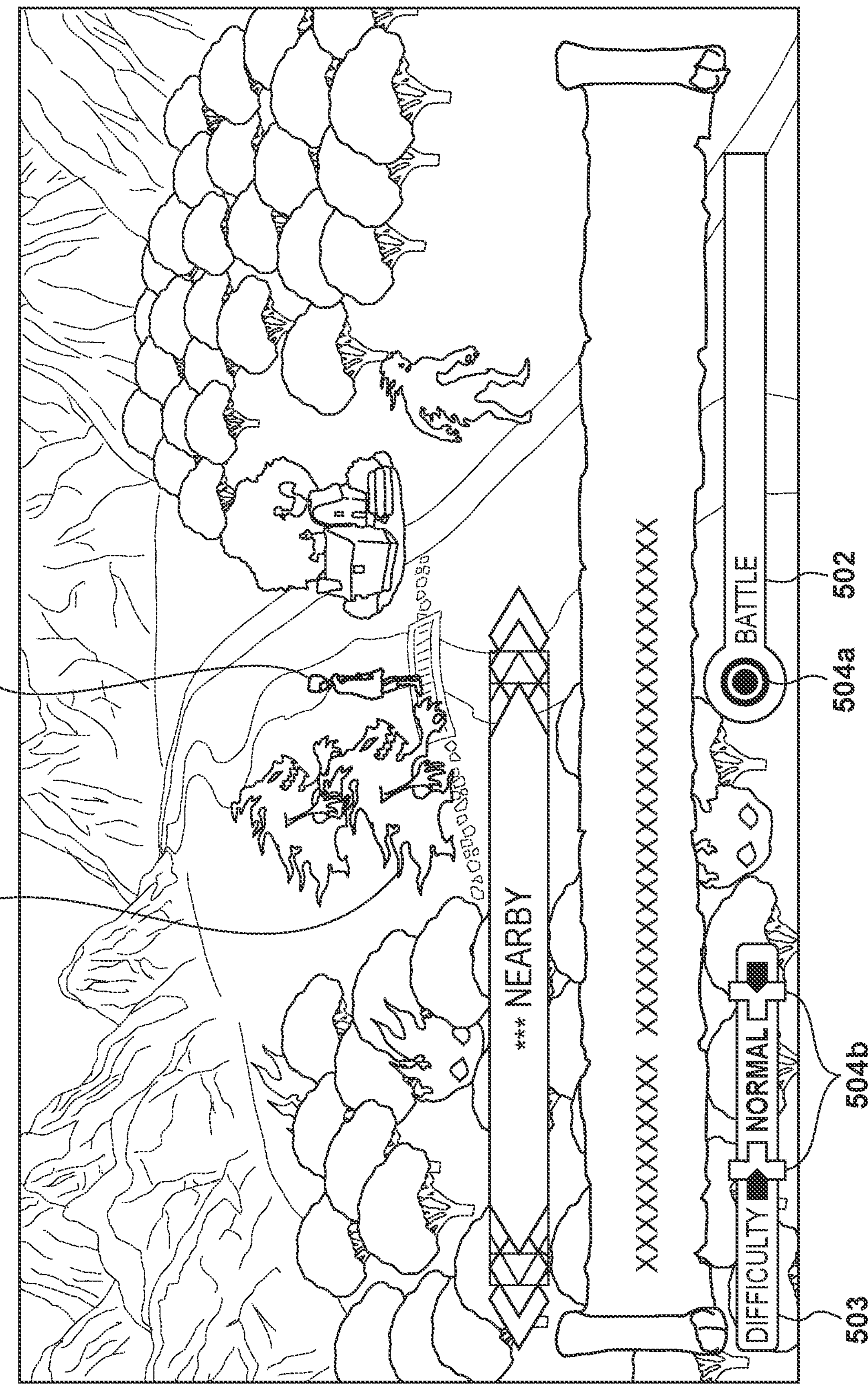
Figure 5B:
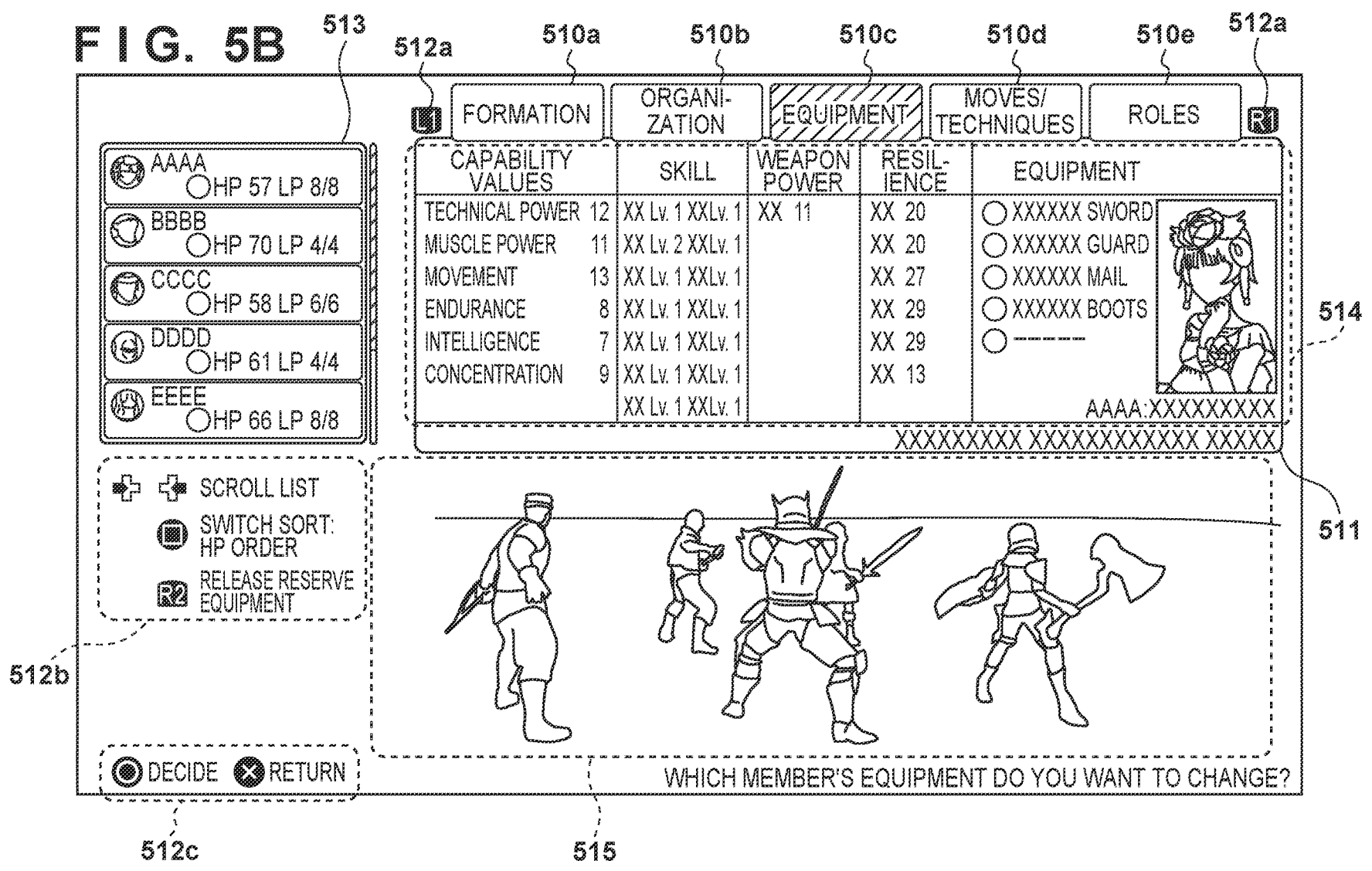

Here, with reference to FIGS. 5A and 5B, description will be given for a configuration of a GUI arranged in a game screen in a case where the physical input scheme is selected. While the GUI corresponding to the physical input scheme is something that has a similar configuration to the game screen displayed with the touch input scheme as illustrated in FIGS. 5A and 5B, it is arranged so as to be a display suitable for an operation input device having a physical operating member. In other words, in a situation in which an external operation input device is connected to the smartphone 100 and operation input is performed thereby, there is no need to display each item in the GUI at a size suitable to a touch operation (a size at which a touch operation by a person's finger is easy to perform), and there is not the problem of configuring each item in a compact way.

FIG. 5A illustrates the field screen displayed in a case where the physical input scheme is selected. As illustrated, similarly to the field screen displayed in the case where the physical input scheme is selected, in the case where an operated character 501 is caused to move to an object 500 that is for a progression of a battle event and that is present in the field, a battle button 502 and a scroll object 503 by which the difficulty is changed are displayed. At that time, in order to receive operation input for these items that is not a touch operation, each GUI is displayed in a state in which guide displays 504*a* and 504*b*, which indicate the operating member on which operation input must be performed to execute the function according to that item, are superimposed thereon or arranged near thereto.

Also, FIG. 5B illustrates the status screen displayed in a case where the physical input scheme is selected. As illustrated, various GUIs that configure the status screen displayed in a case where the physical input scheme is selected, similarly to the case where the touch input scheme is selected, the tabs 510*a* to 510*e* that switch information that can be set or confirmed, and the region 511 in which settings and status confirmation according to each tab can be performed are included. Here, for switching of the tabs 510 and setting and adjusting in the region 511 physical operating members that respectively receive operation input are set, and the guide displays 512*a* to 512*c* for indicating the operating members are displayed in a state in which they are superimposed or arranged nearby each GUI.

In the status screen of FIG. 5B, similarly to the status screen of FIG. 4B, an embodiment of a region 511 in a case where the equipment tab 510*c* is selected is shown as an example, and characters that the user can use in a battle are each displayed selectably in a list 513. Unlike the case where the touch input scheme has been selected, in the status screen in the case where the physical input scheme has been selected, a change in the character to be put in the selected state in the list 513 is assigned to an up-down button of the operating member. Consequently, when operation input is made with respect to the operating member, various statuses including the external appearance of the character that is in the selected state and currently equipped items are displayed on a region 514. The characters in the list 513 are configured to be sortable by an operation input performed in relation to a sort (□) button, and sorting rules switch every time the operation input is performed. Also, in the example of the figure, there are five characters that can be displayed at one time in the list 513, and it is possible to change the display range of the list 513 by a page feeding operation assigned to left/right buttons for other characters that can be used. Change of equipment is possible for the character that is currently in the selected state in the list 513 by an operation input in relation to the deciding (○) button, for example, being performed. More specifically, for the character in the selected state, in a window additionally displayed in accordance with the deciding button, it may be possible to select an item that is to be equipped from owned items for each part of the character.

Essentially, in a game screen displayed in a case where the physical input scheme is selected, since there is no need to guarantee ease of input by touch operations and configure the size and arrangement of GUIs, it is possible to make the size of each item of the GUI smaller as is clear from a comparison of FIG. 4A and FIG. 5A and a comparison of FIG. 4B and FIG. 5B. In particular, in an embodiment in which game play is performed by outputting screens to an external display apparatus, the external display apparatus may have a display region of a larger size than the display unit 110 that the smartphone 100 is equipped with, and therefore even if the font size given to each item of the GUI is made smaller, the visibility of the user is guaranteed. Accordingly, in the status screen in a case where the physical input scheme is selected as exemplified in FIG. 5B, the area that the GUI used for status display and settings occupies can be made to be smaller than the status screen in the case where the touch input scheme exemplified in FIG. 4B has been selected. Consequently, in the game application of the present embodiment, in the other region 515 of the status screen in the case where the physical input scheme is selected, the characters that are currently included in the party are also displayed. In other words, in the status screen displayed in the case where the physical input scheme has been selected, the user can perform various operations while referencing more information.

Conversely, in a game screen displayed in a case where the touch input scheme is selected, since the GUI is configured such that the various functions can only be executed by touch operations, compared to the game screen displayed in the case where the physical input scheme is selected, guide displays for indicating corresponding operating members are not included, and configuration is as a game screen that can be operated intuitively.

In step S309, the operation input reception module 201 determines whether or not an operation was performed in relation to a physical operating member. The operation input reception module 201 moves the processing to step S310 in a case where it is determined that an operation corresponding to a physical operating member was made, and moves the processing to step S312 in a case where it is determined that no touch operation was made.

In step S310, the operation input reception module 201 determines the operation that was made, and determines whether or not it is an operation input corresponding to the execution of one of the functions defined for the physical input scheme. Here, the functions that are the target of the determination are not limited to functions according to the items arranged as GUIs on the game screen. The operation input reception module 201 moves the processing to step S311 in a case where it determines that the performed operation is an operation input corresponding to the execution of one of the functions, and moves the processing to step S312 in the case where it is determined that it is not an operation input corresponding to execution of one of the functions.

In step S311, the game control module 203 executes game control corresponding to operation input in accordance with the performed operation determination content.

In addition to this, in step S312, the game control module 203 executes game control according to the frame that is to be performed irrespective of the existence/absence an operation input. Also, the screen configuration module 204 generates a game screen including a GUI corresponding to the physical input scheme, and performs screen update processing for outputting a display to the display unit 110.

In step S313, the operation input reception module 201 determines whether or not an operation according to a change in the operation input scheme was performed. The operation input reception module 201 returns the processing to step S301 in a case where it is determined that an operation according to a change in the operation input scheme was made, and returns the processing to step S308 in a case where it is determined that no operation was made.

With such a configuration, it becomes possible to provide to the user game play that realizes suitable game operations in a desired operation input scheme according to a program corresponding to a game application of the present embodiment.

Note that in the present embodiment, it was described that the GUI arrangement configuration in the game screen is changed in accordance with which of the touch input scheme and the physical input scheme was selected by the user, and it is switched whether to use a touch operation as operation input for control of a game or to use operation on a physical operating member for control of a game as operation input, but implementation of the present invention is not limited to this. Specifically, in a case where the present invention is applied (a program according to the present invention is executed) to an apparatus to which a touch panel is connected such as a smart phone, a tablet, or a portable game console, even in a state in which the physical input scheme is selected, game play by touch operation may be enabled.

For example, in a case where an apparatus capable of receiving only touch operations as operation input corresponding to the game is used in a situation where an operation input device having a physical operating member is not connected, since depending on the size of the display regions, there is the possibility that touch operation on each item of the GUI will not be difficult even with the GUI arrangement configuration in the case where a physical input scheme is selected, configuration may be such that reception of operation input by touch operations is enabled even with that GUI arrangement configuration. Alternatively, in an embodiment in which a physical operating member is connected, for example, for an operation such as a character input operation or a scroll operation for which a touch operation is more intuitive, so as to guarantee convenience, configuration may be taken such that reception of operation input by a touch operation is enabled even with the GUI arrangement configuration in the case where the physical input scheme is selected.

In such a case, when a touch operation corresponding to a region of a guide display (the guide displays 504*a* and 504*b* in the example of FIG. 5B) that shows the physical operating member that receives the respective function included in the game screen in the case where the physical input scheme is selected is performed, game control may be performed treating it as though an operation input corresponding to that function was performed.

Also, in the embodiment of the present invention, the operation input scheme was described as being selectable by the user changing a setting, but embodiments of the present invention are not limited to this. Configuration may be taken such that irrespective of the user operation, for example, the connection state of the operation input device, the specifications of the hardware on which the program is executed, whether or not there is an external display output, or the like, are determined, and thereby the control unit 101 performs the selection of the operation input scheme.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the operation input control schemes according to the present invention are realizable by a program executing the methods on one or more computers. The program is providable/distributable by being stored on a computer-readable storage medium or through an electronic communication line.

What is claimed is:

1. A non-transitory computer-readable storage medium storing a program configured to enable an operation input scheme to be switched for a game operation in a game, the program causes a computer to execute processing for selecting to receive an operation input by either a first operation input scheme or a second operation input scheme;

processing for receiving an operation input defined for the selected operation input scheme;

processing for, based on the received operation input, controlling the game; and processing for outputting a game screen according to the game, wherein the first operation input scheme is a scheme that receives an operation input by a touch operation only, the second operation input scheme is a scheme that at least receives an operation input made in relation to a physical operating member, the game screen includes a graphical user interface (GUI), a GUI arrangement configuration in the game screen differs depending on which of the first operation input scheme or the second operation input scheme the selected operation input scheme is, the game screen outputted in a case where the second operation input scheme is selected includes, in addition to the GUI, a guide display for indicating an operating member that receives an operation input, and in the second operation input scheme, even in a case where a touch operation in relation to the guide display is made, the touch operation is received as though an operation input corresponding to the guide display was performed.

2. The storage medium according to claim 1, wherein based on an operation input for selection of an operation input scheme, the selection to receive an operation input by either the first operation input scheme and the second operation input scheme is performed.

3. The storage medium according to claim 1, wherein a size of at least a portion of items of the GUI in the game screen is controlled to be larger in a case where the first operation input scheme is selected than in a case where the second operation input scheme is selected.

4. The storage medium according to claim 1, wherein in the game screen outputted in a case where the second operation input scheme is selected, a game element not included in the game screen outputted in a case where the first operation input scheme is selected is arranged.

5. The storage medium according to claim 1, wherein the game screen outputted in a case where the first operation input scheme is selected does not include the guide display.

6. A method for controlling an operation input scheme that controls switching of the operation input scheme for operation of a game, the method comprising:

selecting to receive an operation input by either a first operation input scheme or a second operation input scheme;

receiving an operation input defined for the selected operation input scheme;

based on the received operation input, controlling the game; and outputting a game screen according to the game, wherein the first operation input scheme is a scheme that receives an operation input by a touch operation only, the second operation input scheme is a scheme that at least receives an operation input made in relation to a physical operating member, the game screen includes a graphical user interface (GUI), a GUI arrangement configuration in the game screen differs depending on which of the first operation input scheme or the second operation input scheme the selected operation input scheme is, the game screen outputted in a case where the second operation input scheme is selected includes, in addition to the GUI, a guide display for indicating an operating member that receives an operation input, and in the second operation input scheme, even in a case where a touch operation in relation to the guide display is made, the touch operation is received as though an operation input corresponding to the guide display was performed.

* * * * *